United States Patent [19]
Garzione

[11] 4,322,888
[45] Apr. 6, 1982

[54] MULTI-PURPOSE GAUGE

[76] Inventor: Michael Garzione, 28 Barton St., Newburgh, N.Y. 12550

[21] Appl. No.: 129,177

[22] Filed: Mar. 10, 1980

[51] Int. Cl.³ .................................................. G01B 5/08
[52] U.S. Cl. ................................ 33/178 D; 33/169 B; 33/147 T; 33/158; 33/164 C; 33/164 D; 33/174 A
[58] Field of Search ............ 33/178 D, 174 Q, 174 A, 33/169 B, 143 R, 143 M, 143 K, 147 H, 147 G, 147 E, 147 T, 158, 164 B, 164 C, 164 D

[56] References Cited

U.S. PATENT DOCUMENTS

| | | | |
|---|---|---|---|
| 1,703,736 | 2/1929 | Jacob | 33/143 R |
| 2,855,687 | 10/1958 | Price | 33/178 D |
| 2,994,963 | 8/1961 | Turner | 33/178 D |
| 3,325,903 | 6/1967 | Zurlindier | 33/158 |
| 3,439,430 | 4/1969 | Harris | 33/178 D |

FOREIGN PATENT DOCUMENTS

| | | | |
|---|---|---|---|
| G 15547 | of 1955 | Fed. Rep. of Germany | 33/178 D |
| 897915 | of 1945 | France | 33/178 D |

*Primary Examiner*—Willis Little

[57] ABSTRACT

Disclosed is a multi-purpose measuring gauge in which three probes are secured to and movable with respect to a T-shaped housing. Two outer probes are secured to members which are slideable along parallel slots in the housing. The probe members comprise a rack and are moved by a pinion. The pinion is coupled to a micrometer caliper. The dual travel of the rack and pinion thereby retains the respective relationship between the two probes and the third probe, which is disposed equidistant between the two probes. The stem of the T of the housing has therethrough the third probe. All of the axes of the probes are parallel. The ends of the two outer probes are co-planar. The third probe is moved perpendicularly with respect to that plane by means of another micrometer caliper rotatably secured to the housing. The facing sides of the two outer probes are planar to aid in making measurements. Indicia on each caliper provides a direct reading to make a variety of measurements.

14 Claims, 13 Drawing Figures

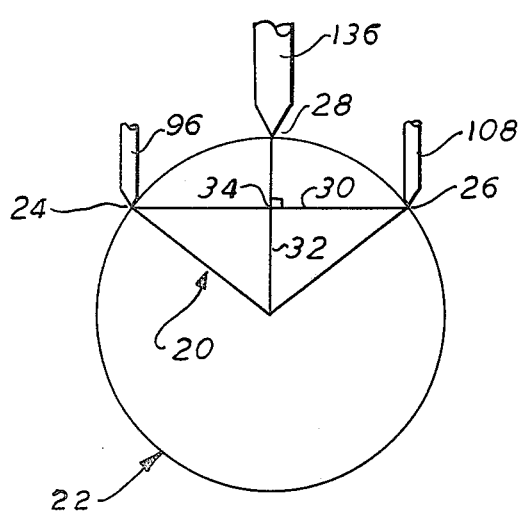
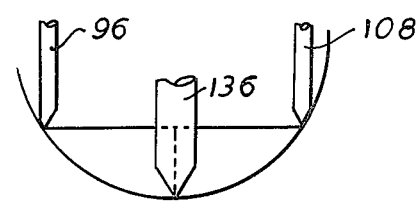
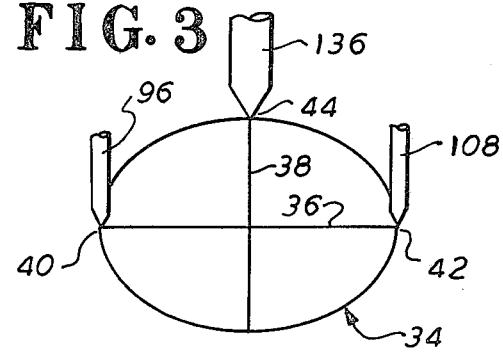
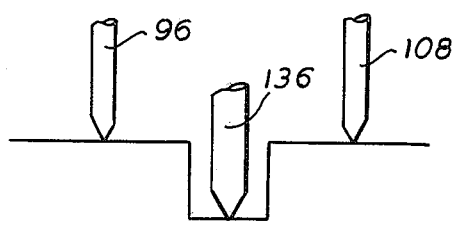
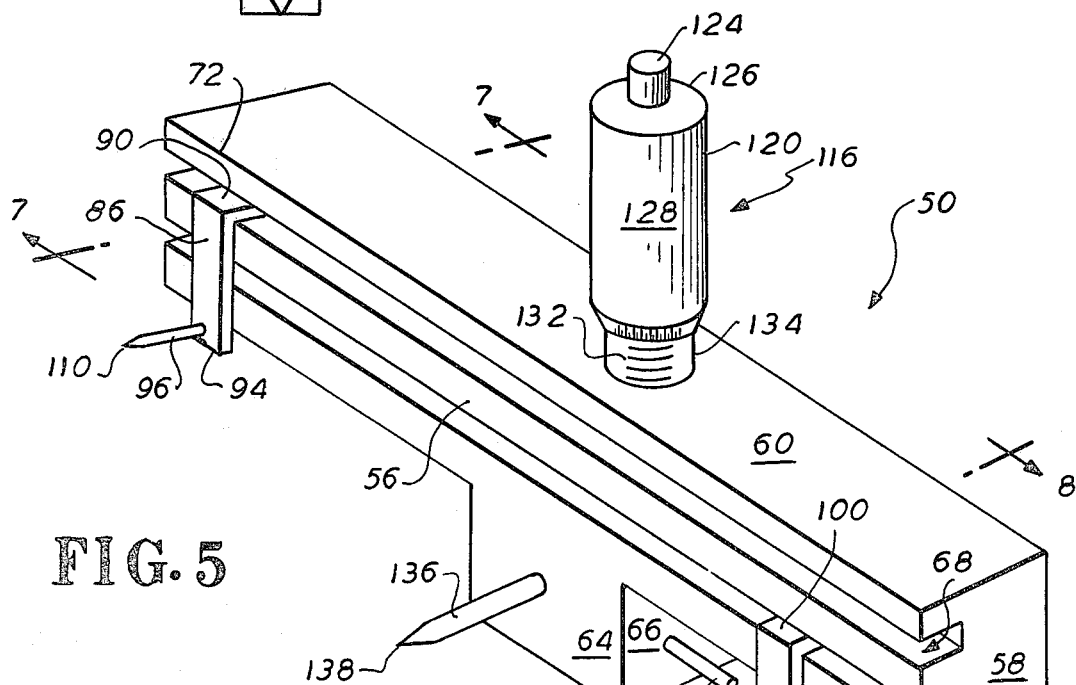

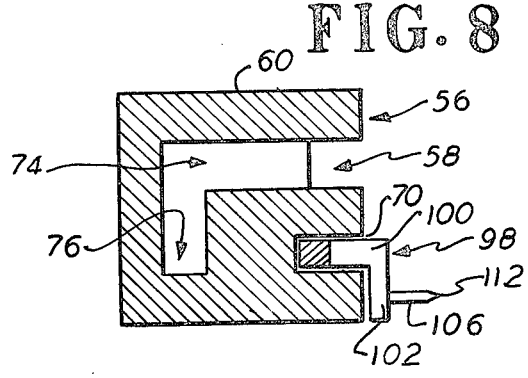
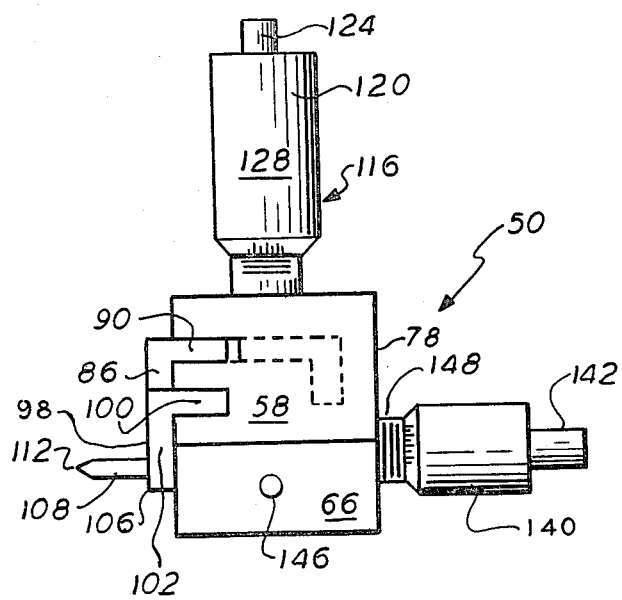
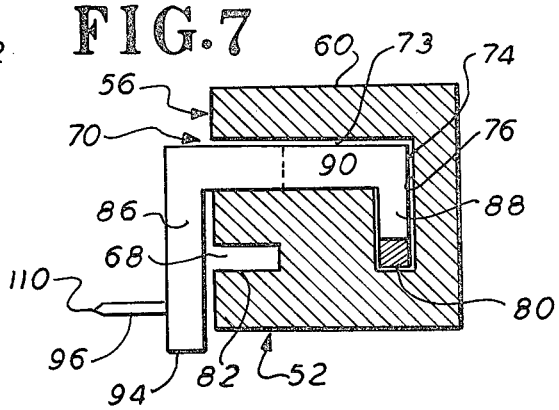
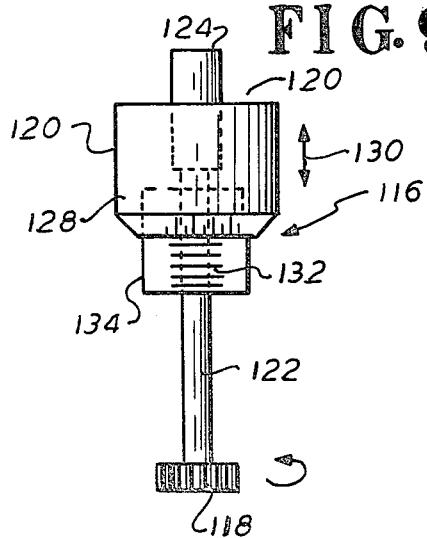
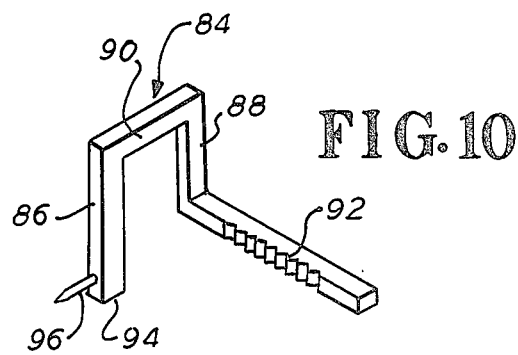
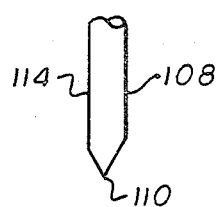
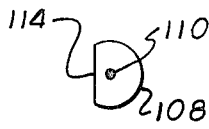
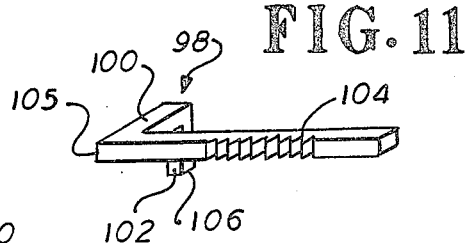

MULTI-PURPOSE GAUGE

BACKGROUND OF THE INVENTION

This invention relates to gauges and, more particularly, to multi-purpose gauges.

It is well established that a radius of curvature of a given arcuate surface can be established if three points on the arcuate surface are known. Based upon this principle, a number of devices have been suggested. One such device is suggested by Price in U.S. Pat. No. 2,855,687. Price provides a rigid, U-shaped member, the ends of which are rectangularly shaped. A micrometer is inserted through the center of the "U" and extends parallel to the legs of the "U". The micrometer adjustment positions to probe. With the spatial relationship of the U-legs being fixed, the probe completes the parameters for determining the radius of curvature. The inner points of the rectangular ends of the "U" are employed to determine the radius of curvature of convex arcuate surfaces, while the points at the exterior of the U-legs are used to determine the radius of curvature of concave surfaces. Additionally, the micrometer may be used as a depth or height measurement with reference to the feet of the "U".

One disadvantage of the Price device is that the legs are not adjustable. Thus, its application to different and varying arcuate surfaces is severely limited. In addition, the device proposed by Price relies upon the principle that the surface contact will be rigid and unyielding compared to the measuring device itself. Should this not be the case, the device by Price could easily provide a false reading. Furthermore, the Price device is not adaptable to measure and determine the dimensions of various elliptical-shaped objects, nor are its feet suitable for measuring spheres of dimensions which are smaller than the legs.

Still another device for determining the three points on an arcuate surface has been proposed by Harris in U.S. Pat. No. 3,439,430. Harris' device is intended for cylindrical objects only. Curiously, Harris' device can vary the position of the outer measuring legs of the gauge (whereas in Price, these legs are fixed), but the central probe cannot determine the third point of curvature. Instead, it is recited and shown as indicating "deviation". "Deviation" is not defined nor is it indicated how the device can be used to calculate the radius of curvature. Accordingly, while Harris' patent discloses the mathematical formula employed by Price and other devices, the device proposed by Harris fails to show a means for determining the crucial third element: the distance of the central probe above the two outer measuring probes. Further, no means are provided within the device by Harris to actually provide a direct indication of the distance between these probes. In the device by Price, this is known because the outer measuring probes are fixed with respect to one another. Furthermore, because the center probe is not adjustable, the device proposed by Harris cannot be used as a depth or height gauge. The outer probes of the Harris device are like Price—rectangularly-shaped members—and, therefore, ill equipped to measure the dimensions of small objects.

All of the prior art devices are believed to have in common a limited number of measurements. Some devices require the two outer probes to be tangent to the arcuate surface. All appear unsuited to make width measurements, as well as depth, height, and radius measurements.

SUMMARY OF THE INVENTION

It is an object of this invention to provide a gauge capable of determining the radius of curvature of an arcuate concave or convex surface.

It is an object of this invention to provide a gauge capable of measuring the relative depth or height of a surface with reference to a reference point on the gauge.

It is another object of this invention to provide a device for measuring the width of objects.

It is another object of this invention to provide a gauge capable of measuring and determining the major/minor axis of ellipsoid objects.

It is yet another purpose of this invention to provide a device for measuring the radius of curvature of spheroids.

It is still another object of this invention to provide a multi-purpose measuring gauge in which the probes are yieldable with reference to the surface contacted, so as to provide an accurate measurement thereof in determining the dimensions.

It is an object of this invention to provide a multi-purpose measuring gauge in which indicia measurements are provided directly thereon for determining the various dimensions measured by the gauge.

It is another object of this invention to provide a multi-purpose gauge capable of measuring the radius of curvature, depth, height, and width of objects.

It is an object of this invention to provide a multi-purpose measuring gauge simple of construction, economic to manufacture, and easy to use.

In furtherance of these and other objects, as may be more fully appreciated from the drawing and the description of the preferred embodiment to follow, there is provided a gauge of the type intended to determine the radius of curvature of an arcuate surface. The gauge comprises a housing. First and second probes are secured to and movable with respect to the housing for contacting the arcuate surface. The free ends of the probe terminate in a common plane. A third probe is provided and secured to and is movable with respect to the housing. This third probe is equidistant between the two outer probes and is intended to contact the arcuate surface. Means are provided secured to the housing for simultaneously positioning the first and second probes with respect to one another and keeping the third probe equidistant therebetween. Means are provided for moving the third probe perpendicularly with reference to the plane. Indicia means are provided for indicating the distance between the first and second probes, as well as the distance of the third probe from the plane.

BRIEF DESCRIPTION OF THE DRAWING

FIGS. 1, 2, 3, and 4 are diagrammatic view of various measurements which may be made with the device of this invention;

FIG. 5 is a perspective view of a gauge constructed in accordance with the teachings of the invention;

FIG. 6 is a side plan view of the gauge of FIG. 1;

FIG. 7 is a sectional view of the gauge of FIG. 5, taken along lines 7—7;

FIG. 8 is a section view of the gauge of FIG. 5, taken along lines 8—8;

FIG. 9 is a schematic view of the means for positioning probes of the gauge shown in FIG. 5;

FIG. 10 is a perspective view of a measuring probe member of the type used in the device of FIG. 5;

FIG. 11 is a perspective view of a measuring probe member of the type used in the device of FIG. 5;

FIG. 12 is an enlarged view of one of the outer measuring probes of this invention; and FIG. 13 is a bottom view of the probe of FIG. 12.

DESCRIPTION OF THE PREFERRED EMBODIMENT

It is well known that one may establish the radius of curvature 20 of an arc 22 (FIG. 1) if three points 24, 26, and 28 are known. Two points 24 and 26 correspond to the points of a chord 30 intersecting the arc 22. The third point 28 corresponds to a point on the arc 22 intersected by a radius 32 which is perpendicular to the chord 30. By definition, this radius 32 bisects the chord 30. By determining the length C of the chord 30 and the distance P from the intersection of the radius 32 with the chord 30 at 34 and arc 22 at 28, one may determine a radius of the arc.

The formula is $R = \frac{(\frac{1}{2}C)^2 + P^2}{2P}$ where:
R = Radius
C = Length of the chord 30
P = Perpendicular length from the chord to the intersection with the radius of curvature (34-28)

It is clear that this formula applies to a convex arc (FIG. 5) or a concave arc (FIG. 2).

If the three-dimensional surface to be measured is ellipsoid 34 (FIG. 3), the elliptical curvature may be determined if two elements are known: the length of the major axis 36 and the length of the minor axis 38. Thus, if three measurement points can be disposed about the ellipsoid 34 so that the distance between the outer measuring points 40 and 42 indicates the length of the major axis 36, while the spacing above the major axis determines a third point 44, or one-half the length of the minor axis (i.e., the vertical distance between 40, 42, and 44), the parameter of the ellipse may be determined. If the vertical distance between the center point and the outer measuring points is known, it is clear that a depth or height can be measured, as well. A depth measuring configuration is indicated schematically at FIG. 4.

With these measurements in mind, we turn now to the device of this invention: A multi-purpose measuring gauge 50 (FIGS. 5 and 6). The gauge 50 may comprise a substantially T-shaped housing 52, which may be made of any rigid material, such as plastic or the like. The cross-bar 54 of the housing 52 may have a generally rectangular cross section with a planar front face 56, side faces 58 (only one is visible in FIG. 5), a top face 60, and bottom face (not visible). The stem 62 is generally rectangularly shaped. The front face 64 is co-planar with the front face 56 of the cross-bar 54 of the housing 52. The planar side faces (only one face 66 is visible in FIGS. 5 and 6) extend the width of the side faces 58 and is co-terminus with the rear face (not visible) of the cross-bar 54.

The front face 56 of the housing 52 has defined therein two parallel, rectangularly-shaped slots 68 and 70. The slots 68 and 70 extend parallel to the longest dimension 72.

The housing 52 may be generally hollow. The first slot 70 is one leg of a generally L-shaped aperture 74 (FIG. 7). The second leg 76 extends perpendicularly from the first leg 73 and adjacent to the rear wall 78 of the housing 52. The second leg 76 terminates so that the base 80 thereof is in registry with and spaced from the base 82 of the second slot 68. The purpose of this alignment will become apparent from the discussion below. The symmetrical center of the housing 52 is hollow.

Slidable in the first slot 68 may be a substantially U-shaped member 84 (FIGS. 5, 6, 7, 10). The legs 86 and 88 of the U-shaped member 84 may be disposed parallel to one another and perpendicular to the joining member 90. One leg 86 of the U-shaped member extends downwardly with respect to the top face 60 of the housing 52. The joining member 90 of the U-shaped member 84 extends through the slot 68. At the end 74 of the leg 88 within the housing 52 and extending perpendicularly with respect thereto and substantially along the length 72 of the housing 52 is an integrally formed rack 92. Secured at the end 94 of the leg 86 of the U-shaped member 84 which is outside of the housing 52, and extending perpendicularly with respect to the front face 56, is a first probe 96. The probe 96 may be made of any structural material, such as steel or plastic.

An L-shaped member 98 has one leg 100 within the lower slot 70. The other leg 102 extends vertically downward from the lower slot 70. Extending perpendicularly from the free end 105 of the leg 100 which is within the slot 70 is a rack member 104. The rack member 104 extends along the length 72 of the housing 52. Secured to the free end 106 of the leg 102 and perpendicular to the front face 56 of the housing 52 is a probe 108. Each probe 96 and 108 may have a generally cylindrical shape and terminate in conically shaped points 110 and 112, respectively. These points 110 and 112 lie in an imaginary plane. One side 114 of each probe 96 and 108 is planar. Preferably, the planar sides 114 (FIGS. 12 and 13) of each probe 96 and 108, respectively, are opposed to one another. The function of the probes will be more fully discussed hereinafter.

Extending vertically through an aperture in the symmetrical center of the top face 60 may be a means 116 for simultaneously adjusting the relative positions of the probes 96 and 108. This adjustment means 116 is preferably a pinion 118 coupled to a micrometer caliper 120.

As previously indicated, the housing 52 is generally hollow. The probe members 84 and 98 are so dimensioned that the probes 96 and 108 are aligned so that their axes are parallel. The racks 92 and 104 are disposed in alignment within the housing 52 and engaged by the pinion 118. The pinion 118 is, in turn, rotated by the shaft 122 (FIG. 9) of the micrometer caliper 120. The shaft 122 is connected to the micrometer caliper 120 to rotate, rather than move outwardly, as is the customary construction.

It is preferable to use a Starret micrometer caliper. This device is provided with two concentrically mounted control shaft 124. The column 124 may be used, for example, to rotate the pinion 118 in a clockwise direction. The column 124 may also be used to rotate the pinion 118 in the counter-clockwise direction. The construction of this micrometer caliper is such that when the probes 96 and 108 meet a surface which is somewhat resistant to its movement, the shaft 124 will spin freely and will disengage from the probes 96 and 108. As with similar micrometer calipers, rotation of the control shaft 124 causes a sleeve 128 to move vertically (see arrow 130, FIG. 9), thereby revealing or covering indicia 132 on a concentrically mounted columnar member 134, as is well known in the art. Thus, the probes 96 and 108 are engaged to move simultaneously in opposite directions with respect to one another and parallel to the front face 56 of the housing.

Extending perpendicularly from the center of the front face 64 of the stem 62 of the housing, and moving with respect thereto, may be a center probe 136. The axis of the center probe 136 is parallel to the axes of the two other probes 96 and 108 and equidistant therebetween. The center probe 136 is preferably cylindrical with a conical tip 138. A micrometer caliper 140, and preferably a Starret micrometer caliper, is secured through an aperture in the rear of the housing 52 and axially aligned with the center probe 136. Rotation of the concentrically mounted control shaft 142 (FIG. 6) causes the micrometer caliper 140 to move the center probe 136 perpendicularly with respect to the aforementioned probe plane.

A locking screw 146 (FIGS. 5 and 6) is threaded through an aperture in the side face 66 of the stem section 62 of the housing 52 to releasably engage the center probe 136.

There is thus provided a multi-purpose gauge which, in a single instrument, can determine the radius of curvature of convex or concave arcuate surfaces and spheroids, determine the configuration of ellipsoids, and make relative depth, height, and width measurements.

In operation, the multi-purpose gauge 50 may be used to measure the radius of curvature of an arcuate surface, whether that surface is concave or convex, according to the formulas indicated above. The user advances the center probe 136 until its point 138 contacts an arcuate surface (FIGS. 1 or 2). Upon contact, the control column 142 swings free and the probe 136 cannot be advanced further. The center probe 136 may then be locked in position by the locking screw 146. The user then extends the outer probes 96 or 108 until such time as they contact the arcuate surface. The exposed indicia 132 and 148 (in the second caliper 140) provides an indication of the relative positions of the probes 96, 108, and 136 to determine the radius of curvature. This indicia may be provided in a table so that all the user need do is read the two numbers from the calipers 120 and 140 and make reference to the reference chart to determine the radius of curvature. This same procedure may be used to determine the radius of curvature of small spheriods. Where the dimensions of the object to be measured are warranted, the planar surfaces 114 engage the sphere, enabling a direct reading of the radius of curvature. A separate chart can be provided for these readings.

It should be noted that the rack and pinion construction maintains the probes 96 and 108 equidistant from the center probe 136 during the entire movement by the micrometer 120.

In a like manner, again using the planar sides 114 of the probes 96 and 108, respectively, one may make a measurement of an ellipsoid object (see FIG. 3).

Yet another use of the multi-purpose gauge is as a depth or height gauge in which the "0" indicia of the center probe micrometer caliper 140 indicates that the conical point 138 of the probe 136 is co-planar with the points 110 and 112 of the probes 96 and 108, respectively. The lowering or raising of the center probe 136 by the micrometer caliper 140 provides an immediate indication of the relative depth or height.

In yet another use of this device, the width of a device can be determined by retracting the center probe 136 and using the inner planar surfaces 114 of the probes 96 and 108, respectively, to measure the width by merely directly reading the indicia from the micrometer caliper 120.

What is claimed:

1. A gauge comprising:
   (a) a housing;
   (b) first and second spaced probes secured to and movable with respect to said housing; said probes having free ends terminating in a plane;
   (c) a third probe secured to and movable with respect to said housing and intermediate to said first and second probes;
   (d) means secured to said housing for simultaneously positioning said first and second probes with respect to one another, such that said third probe remains equidistant from said first and second probes and said free ends remain in said plane; said simultaneous positioning means comprises means for releasably yielding, such that, upon said first or second probes contacting a resistant surface, said positioning means substantially disengaging from said first and second probes;
   (e) means for moving said third probe substantially perpendicularly with reference to said plane; said means for moving said third probe comprises means for releasably yielding, such that, upon said third probe contacting a resistant surface, said means for moving the third probe substantially disengaging from said third probe; and
   (f) indicia means for indicating the distance between said first and second probes and the distance of said third probe from said plane.

2. A gauge as recited in claim 1 wherein said means for moving said third probe comprises means for releasably yielding, such that, upon said third probe contacting a resistant surface, said means for moving the third probe substantially disengaging from said third probe.

3. A gauge as recited in claim 2 wherein said probes being substantially cylindrical and having conical ends.

4. A gauge as recited in claim 3 wherein said first and second probes each have a planar side extending parallel to the axis of said probe, each planar side being opposed to one another.

5. A gauge as recited in claim 4 wherein said indicia means comprises first indicia means being in combination with said simultaneous positioning means such that adjustment of said simultaneous positioning means provides indicia of the relative position of said first and second probes; said indicia means further comprises second indicia means in combination with said means for moving such that adjustment of said means for moving provides indicia of the relative position of said third probe with respect to said plane.

6. A gauge as recited in claim 5 wherein said housing having parallel slots therein; said first and second probes being secured to probe members; each of said first and second probe members being slideable within one of said slots; said probe members, in combination with said simultaneous adjustment means, comprise a rack and pinion with dual travel; said simultaneous adjustment means comprising said pinion.

7. A gauge as recited in claim 6 further comprising means for releasably locking said third probe; said probes being substantially cylindrical and having the axes thereof parallel to one another.

8. A gauge as recited in claim 7 wherein said housing is substantially T-shaped and hollow; said first probe member comprises a generally U-shaped member with one leg of said "U" being disposed parallel to a planar face of the cross bar of said housing; the joining member of said "U" member being at right angles to said first member and slideable within said slot; said slot being within said cross-bar; the second leg of said "U" member extending within said housing; a rack member integrally formed with said "U" member and extending from and at right angles to said leg within said housing; said second probe member being substantially L-shaped; one leg of said L-shape extending downwardly in front of said cross-bar and the other leg being slideable within said other slot; a rack member integrally formed and extending perpendicularly from the end of said leg within said slot of said second probe member; said simultaneous adjustment means comprises a pinion for engaging said rack members and a micrometer caliper rotatably secured to said housing cross-bar coupled to said pinion for turning said pinion and thereby providing said indicia; said third probe extending through the stem of said housing; a micrometer caliper coupled to said third probe and rotatably secured to said housing for moving said probe and providing said indicia.

9. A gauge as recited in claims 5 or 1 wherein said simultaneous adjustment means comprises a first micrometer caliper; said means for moving said third probe comprises a second micrometer caliper.

10. A gauge as recited in claim 9 wherein said indicia means comprises indicia upon said first and second micrometers.

11. A multi-purpose gauge comprising:
(a) a housing;
(b) three probes secured to and movable with respect to said housing and movable with respect to each other;
(c) said probes being in a first plane; a first and second of said probes having their ends in a second plane; the third of said probes disposed equidistant between said first and second probes; said third probe being movable perpendicularly with respect to said second plane;
(d) means coupled to said housing for said moving of said probes; said moving means comprises a first micrometer caliper; said first micrometer caliper being coupled to said first and second probes and a second micrometer caliper coupled to said third probe; and
(e) indicia means coupled to said moving means for indicating the relative position of said probes such that, with said first, second, and third probes contacting an arcuate surface, said gauge providing indicia for determining the radius of curvature; with said first and second probes being disposed across the major axis of an ellipsoid and said third probe contacting the minor axis, said gauge providing indicia of dimensions of the ellipsoid; with said first and second probe engaging a surface, said indicia means indicating the relative height or depth of said third probe with respect to said first and second probes; with said third probe withdrawn, said first and second probes engaging the sides of an object, said indicia means indicating the width of the object; said indicia means comprises indicia upon said first caliper for providing measurements of the distances between said first and second probes and further comprises indicia upon said second caliper for providing measurements of said point of said third probe from said second plane.

12. A multi-purpose gauge comprising:
(a) a housing;
(b) three probes secured to and movable with respect to said housing and movable with respect to each other;
(c) said probes being in a first plane; a first and second of said probes having their ends in a second plane; the third of said probes disposed equidistant between said first and second probes; said third probe being movable perpendicularly with respect to said second plane;
(d) means coupled to said housing for said moving of said probes and a second micrometer caliper coupled to said third probe; said indicia means comprises indicia upon said second caliper for providing measurements of said point of said third probe from said second plane; and
(e) indicia means coupled to said moving means for indicating the relative position of said probes such that, with said first, second, and third probes contacting an arcuate surface, said gauge providing indicia for determining the radius of curvature; with said first and second probes being disposed across the major axis of an ellipsoid and said third probe contacting the minor axis, said gauge providing indicia of dimensions of the ellipsoid; with said first and second probe engaging a surface, said indicia means indicating the relative height or depth of said third probe with respect to said first and second probes; with said third probe withdrawn, said first and second probes engaging the sides of an object, said indicia means indicating the width of the object.

13. A multi-purpose gauge as recited in claims 11 or 12 wherein said first and second probes being substantially cylindrical with opposed facing planar surfaces; each of said planar surfaces extending parallel to said axes of said first and second probes for engaging objects to be measured.

14. A multi-purpose gauge comprising:
(a) a housing;
(b) three probes secured to and movable with respect to said housing and movable with respect to each other;
(c) said probes being in a first plane; a first and second of said probes having their ends in a second plane; the third of said probes disposed equidistant between said first and second probes; said third probe being movable perpendicularly with respect to said second plane; said first and second probes being substantially cylindrical with opposed facing planar surfaces; each of said planar surfaces extending parallel to said axes of said first and second probes for engaging objects to be measured;
(d) means coupled to said housing for said moving of said probes; and
(e) indicia means coupled to said moving means for indicating the relative position of said probes such that, with said first, second, and third probes contacting an arcuate surface, said gauge providing indicia for determining the radius of curvature; with said first and second probes being disposed across the major axis of an ellipsoid and said third probe contacting the minor axis, said gauge providing indicia of dimensions of the ellipsoid; with said first and second probe engaging a surface, said indicia means indicating the relative height or depth of said third probe with respect to said first and second probes; with said third probe withdrawn, said first and second probes engaging the sides of an object, said indicia means indicating the width of the object.

* * * * *